United States Patent [19]

Aiki et al.

[11] Patent Number: 5,410,540
[45] Date of Patent: Apr. 25, 1995

[54] SHARED-BUFFER-TYPE ATM SWITCH HAVING COPY FUNCTION AND COPY METHOD THEREOF

[75] Inventors: Kiyoshi Aiki, Hachioji; Takahiko Kozaki, Koganei; Noboru Endo, Kodaira; Haruo Shibata, Yokohama, all of Japan

[73] Assignee: Hitachi, Ltd., Tokyo, Japan

[21] Appl. No.: 132,999

[22] Filed: Oct. 7, 1993

[30] Foreign Application Priority Data

Oct. 8, 1992 [JP] Japan .................................. 4-269969

[51] Int. Cl.[6] ............................................ H04Q 11/04
[52] U.S. Cl. ........................................... 370/60; 370/61
[58] Field of Search ...................... 370/60, 94.1, 58.1, 370/58.2, 58.3, 60.1, 61, 59, 63, 64, 65.5, 66, 68, 92, 93

[56] References Cited

U.S. PATENT DOCUMENTS 4,947,388  8/1990  Kuwahara ............................ 370/60
5,202,885  4/1993  Schrodi et al. ...................... 370/60
5,229,991  7/1993  Turner ................................. 370/60
5,233,603  8/1993  Takeuchi ............................. 370/60
5,271,004  12/1993  Proctor et al. ..................... 370/60

*Primary Examiner*—Douglas W. Olms
*Assistant Examiner*—Huy D. Vu
*Attorney, Agent, or Firm*—Antonelli, Terry, Stout & Kraus

[57] ABSTRACT

In a shared-buffer-type ATM switch including a multiplexer, a shared buffer memory, a demultiplexer, a buffer memory controller, a cell copy section is disposed between the multiplexer and the memory. The copy section produces a plurality of copies of a broadcast cell according to information of a copy information table and adds associate routing information to each copied cell so as to write the cells in the memory. In response to an indication from an output counter, the cells are read from the memory to be distributed to output ports, thereby implementing a broadcast function.

14 Claims, 13 Drawing Sheets

5,410,540

SHARED-BUFFER-TYPE ATM SWITCH HAVING COPY FUNCTION AND COPY METHOD THEREOF

BACKGROUND OF THE INVENTION

The present invention relates to an asynchronous transfer mode (ATM) switch for achieving a switching operation of ATM cells in a cell unit, and in particular, to a shared-buffer-type ATM switch suitable for a broadcast function.

In an ATM switch, an ATM cell (namely, a fixed-length packet) is destined to an output port based on routing information contained in a header field of the cell, thereby conducting a switching operation of the ATM cell. Consequently, the cell is delivered to the output port associated therewith. However, to achieve various operations including distribution services and conference services, it is necessary to output an identical ATM cell to a plurality of output ports. The function for the cell distribution is called a broadcast function and the ATM cell used for the function is called a broadcast cell.

Heretofore, a configuration of a shared-buffer-type ATM switch having such a broadcast function has been described, for example, in the JP-A-1-256246. According to the broadcast function of the ATM switch, a broadcast cell is temporarily stored in a broadcast cell register on an output side of a shared buffer memory such that the cell is transmitted to a plurality of output ports indicated by a broadcast routing table in a cycle of output port designation in which all output port numbers are sequentially denoted by an output counter indicating the port numbers in a periodic manner.

In the conventional shared-buffer-type ATM switch having the broadcast function, a non-broadcast cell is kept in an output wait state during a period of an output port designating cycle of output timing in which an identical broadcast cell is outputted to a plurality of output ports. Moreover, to distribute an identical broadcast cell to a plurality of output ports, there is required one output port designation cycle irrespectively of the number of output ports used for the broadcast operation. In addition, to transmitting broadcast cells, there is required a period of time which is n times that consumed for the transmission of a broadcast cell. Consequently, an output probability of non-broadcast cells is lowered due to broadcast cells, which leads to a problem of reduction in the switch throughput. According to the conventional method of outputting a broadcast cell, a check is made to decide whether or not a cell delivered from the shared buffer is a broadcast cell. If this is the case, there are produced copies of the cell to be distributed to the respective output ports. In consequence, non-broadcast cells are set to the wait state and hence there arises a problem that the memory capacity is to be increased. Furthermore, while the broadcast cell is being copied as many times as there are the predetermined output ports, non-broadcast cells are in the wait state during the copy operation, which leads to deterioration of the throughput of the ATM switch.

SUMMARY OF THE INVENTION

It is therefore an object of the present invention to provide a method of configuring an ATM switch of a shared buffer type having a broadcast function in which there is not required the undesirable wait time of non-broadcast cells due to the output timing exclusively disposed to output only broadcast cells, thereby improving the throughput.

In order to achieve the above object, according to the present invention, there is provided a shared-buffer-type ATM switch including multiplexing means for multiplexing ATM cells received from input ports, cell copying means for producing copies of a broadcast cell, shared buffer memory means for storing therein the multiplexed ATM cells, demultiplexing means for demultiplexing the ATM cells read from the shared buffer memory means and transmitting the demultiplexed data items to output ports, and buffer memory control means for reading and writing ATM cells from and in the memory means. The cell copying means is disposed between the multiplexing means and the memory means and has a function to discriminate broadcast cells from non-broadcast cells and to produce for a broadcast cell a predetermined number of copies thereof so as to add routing information thereto, thereby outputting the copies to a plurality of output ports.

In the ATM switch described above, the copy means arranged between the multiplexing means and the memory means judges a cell type identifier in a header field of the ATM cell to determine whether the cell is a broadcast cell or a non-broadcast cell. When the cell is a broadcast cell, there are produced copies thereof by a copy control section. The number of copies is designated by a copy information table. Thereafter, for each copy, routing information indicating an output port is additionally stored in the header field. In consequence, a period of an output port designating cycle conventionally required to copy a broadcast cell is unnecessitated. Moreover, as compared with the prior art in which the cell copying means is disposed between the shared buffer means and the demultiplexing means, the cell copying means is disposed between the shared buffer means and the buffer memory means according to the present invention, thereby suppressing the wait state of cells on the output side.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to FIGS. 1 to 13, description will be given of embodiments according to the present invention.

Figure 1:
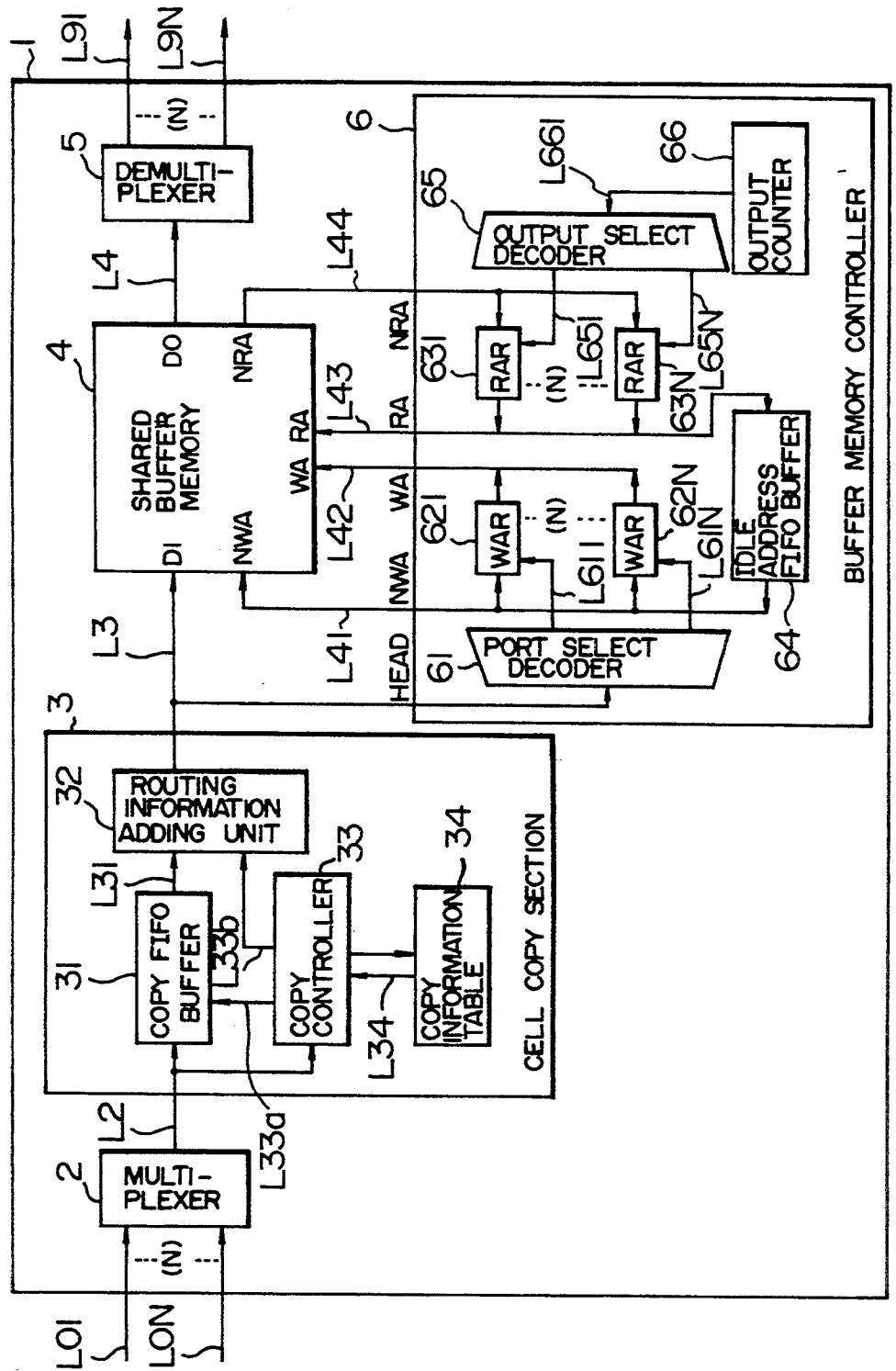
FIG. 1 is a diagram schematically showing the configuration of a shared-buffer-type ATM switch having a copy function in a first embodiment according to the present invention.
Figure 2:
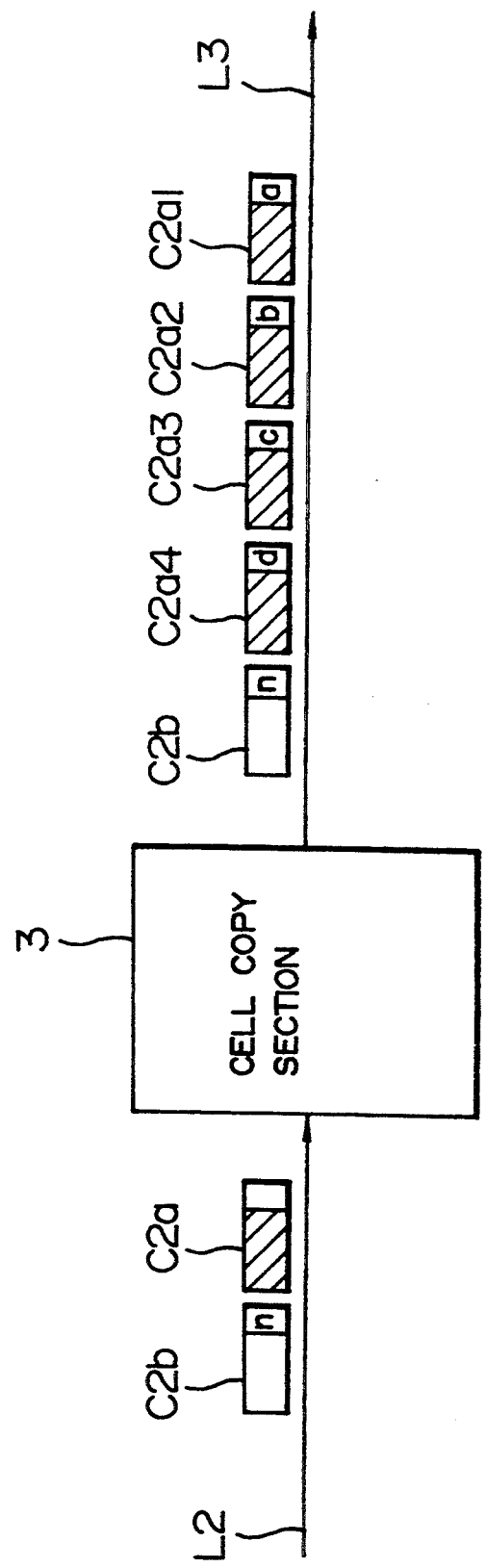
FIG. 2 is a diagram for explaining operation of a cell copy section of the buffer-type ATM switch in the first embodiment according to the present invention.
Figure 3:
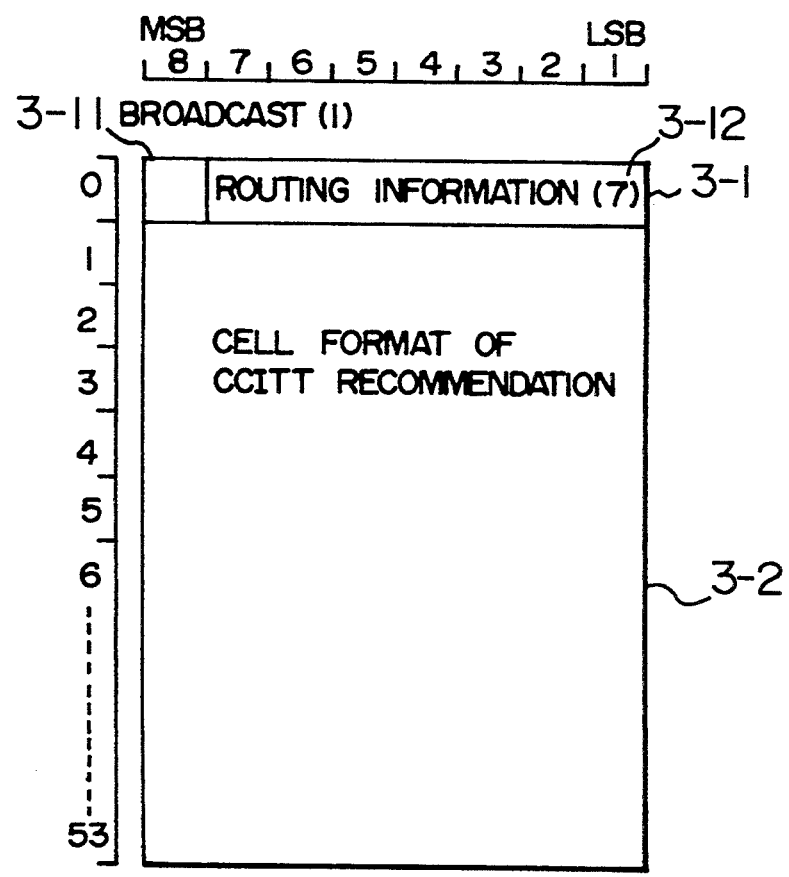
FIG. 3 is a diagram illustratively showing the format of an TM cell of the buffer-type ATM switch in the first embodiment according to the present invention.

First, a first embodiment of the present invention will be described by reference to FIGS. 1 to 3. FIG. 1 shows the structure of a shared-buffer-type ATM switch having a copy function in a first embodiment according to the present invention. FIG. 2 is a diagram for explaining operation of a cell copy section of the buffer-type ATM switch. FIG. 3 is a diagram showing the format of an ATM cell of the ATM switch.

Referring first to FIG. 3, description will be given of the format of the ATM cell of the ATM switch. According to CCITT recommendations, an ATM cell has a 53-byte format. The ATM cell format of this embodiment is 54 bytes long, namely, a one-byte additional header 3-1 is added to the 53-byte ATM cell 3-2. The header 3-1 includes a 1-byte cell type identifier 3-11 and 7-bit routing information 3-12.

Next, the construction of the ATM switch will be described by reference to FIG. 1. The switch 1 includes a multiplexer 2 for multiplexing ATM cells received from input ports L01 to L0N, a cell copy section 3 for producing copies of a broadcast cell, a shared buffer memory section 4 for storing therein the multiplexed ATM cells for each output port, a demultiplexer 5 for demultiplexing ATM cells read from the memory 4 and distributing the obtained items to output ports L91 to L9N, and a buffer memory control section 6 for controlling read and write addresses of the memory 4 and thereby controlling the ATM cells for the respective output ports.

Furthermore, the cell copy section 3 includes a copy FIFO buffer 31 for storing therein the ATM cells inputted via the input ports L01 to L0N, a routing information adding unit 32 for adding routing information to each copied broadcast cell, a copy controller 33 for generating copies of a broadcast cell, and a copy information table 34 for keeping therein the number of copies to be thus created and the routing information.

In addition, the buffer memory control section 6 includes a port selecting decoder 61 for designating, based on the routing information contained in the additional header of the ATM cell, a write address register (WAR) corresponding to an output port, write address registers (WAR's) 621 to 62N for indicating write addresses (WA's) of the memory 4, read address (RAR's) for indicating read addresses (RA's) of the memory 4, an idle address FIFO buffer 64 for reading therefrom a next write address (NWA) and for writing therein a read address (RA), an output selecting decoder 65 for selecting a read address register (RAR) associated with an output port number, and an output counter 66 for denoting an output port number.

Subsequently, the copy operation of the broadcast cell by the cell copy section 3 will be described.

An ATM cell transmitted from the multiplexer 2 onto a signal line L2 is stored in the buffer 31 and is judged by the controller 33 to determine whether the cell is a broadcast cell or a non-broadcast cell according to the cell type identifier contained in the additional header field thereof. For an ATM cell judged to be a broadcast cell, the copy information table 34 selects therefrom, based on the routing information in the header field, the number of copies and routing information, thereby outputting the selected items onto a line L34. To update the number of copies and routing information, the table 34 is controlled, for example, by a micro computer interface. The copy controller 33 outputs read control information via a line L33a to the buffer 31. Simultaneously, the controller 33 sends routing information, which is received from the line 34, via a line 33b to the routing information adding unit 32. The unit 32 receives as an input thereto a broadcast cell outputted onto a line L31, produces copies thereof according to the number specified by the table 34, adds routing information to each copied broadcast cell, and then delivers the cell to a line L3. The buffer 31 stores therein ATM cells inputted from the input ports during the copy operation of the broadcast cell so as to temporarily save the ATM cells therein. After the copy is finished, the buffer 31 outputs the ATM cells onto the line L3.

Referring now to FIG. 2, description will be given of the copy operation of the broadcast cell by the copy section 3. Assume that the section 3 receives a broadcast cell C2a and a non-broadcast cell C2b via the line L2. If the copy information table 34 contains routing information items a to d, the copy section 3 produces four copies C2a1, C2a2, C2a3, and C2a4 of the broadcast cell C2a and adds routing information items a to d respectively to the copied cells C2a1, C2a2, C2a3, and C2a4, thereby delivering the obtained cells to the line L3. During the copy operation of the broadcast cell, the non-broadcast cell C2b is temporarily saved in the buffer 31 of the copy section 3 and is thereafter outputted onto the line L3 when the broadcast cells are entirely transmitted. That is, the ATM cells are sent to the line L3 in a sequence of the broadcast cells C2a1, C2a2, C2a3, and C2a4 followed by the non-broadcast cell C2b.

Next, a method of controlling addresses of the shared buffer memory 4 by the control section 6 will be described by reference to FIG. 1. ATM cells received via the input ports L01 to L0N are multiplexed by the multiplexer 2 and are then stored via the copy section 3 in the memory 4 in a cell-by-cell fashion. In this operation, routing information of the additional header field of each cell is decoded by the decoder 61 so as to attain an output port number. A value of a write address register (WAR) associated with the number is transferred as a write address WA via a line L42 to the memory 4. In this situation, a next write address NWA is outputted from the buffer 64 and is stored in the memory 4 according to an address identical to the write address WA of the ATM cell. Moreover, the next write address NWA is also stored in the write address register (WAR) having outputted the write address WA.

On the other hand, the ATM cell acquired from the memory 4 is distributed by the demultiplexer 5 to an output port (L91 to L9N) indicated by the output counter 66. The counter 66 sends an output port number via a line L661 to the decoder 65 to be decoded therein. A read address register (RAR) corresponding to an output port designated by the decoded result is then accessed to read therefrom a read address RA. The read address is fed via a line L43 to the memory 4. In this operation, an ATM cell and a next read address NRA are read from the memory 4. The read address RA is stored in the buffer 64 and the next read address NRA is stored in the read address register (RAR) from which the read address RA has been read.

As a result of the above operation, a broadcast cell received via an input port is subjected to a copy operation by the cell copy section 3 so as to produce copies thereof. The copies are stored in the memory 4 to be read therefrom according to indication of the output counter 66 and are distributed to the respective output ports, thereby implementing the broadcast function.

Figure 4:
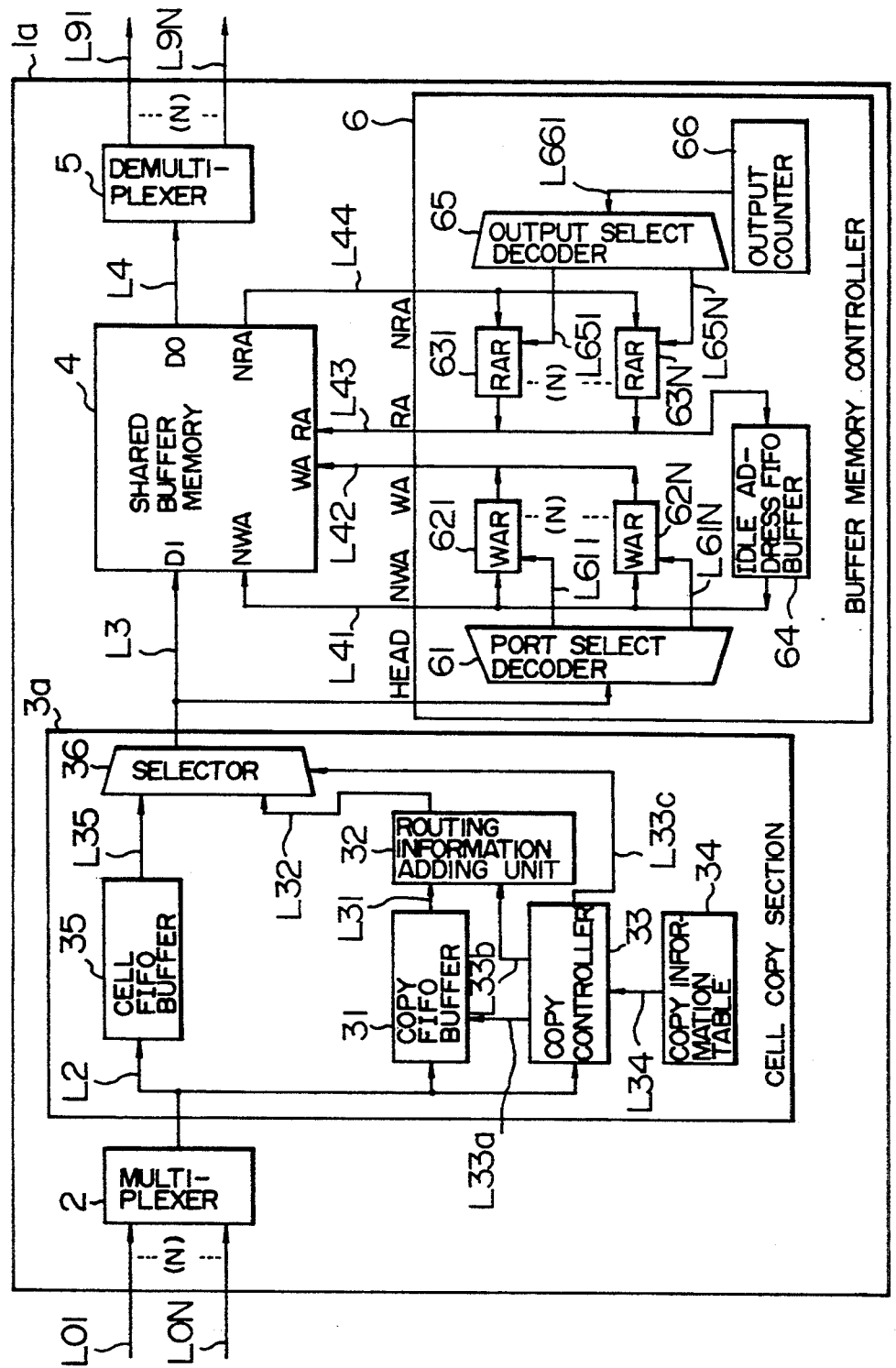
FIG. 4 is a schematic diagram showing the constitution of a shared-buffer-type ATM switch having a copy function in a second embodiment according to the present invention.
Figure 5:
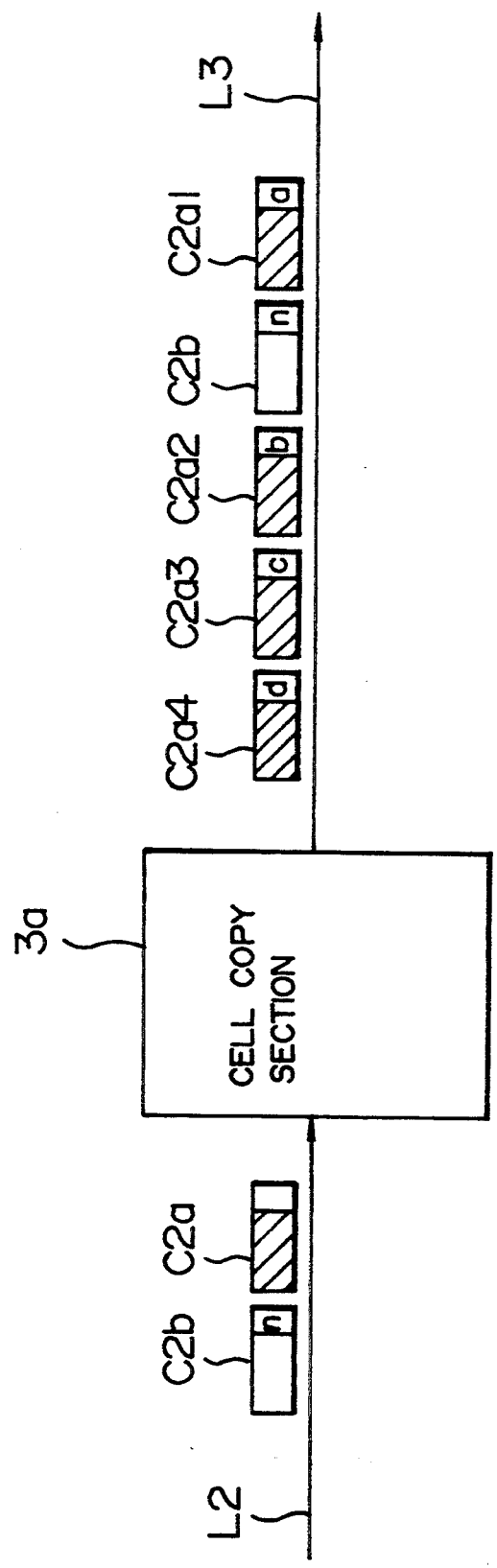
FIG. 5 is a diagram for explaining operation of a cell copy section of the buffer-type ATM switch in the second embodiment according to the present invention.

Referring next to FIGS. 4 and 5, description will be given of a second embodiment according to the present invention. FIG. 4 shows the structure of a shared-buffer-type ATM switch having a copy function in a second embodiment of the present invention. FIG. 5 schematically shows operation of the cell copy section of the ATM switch.

The construction of the ATM switch will be described by reference to FIG. 4. The switch 1a includes a multiplexer 2 for multiplexing ATM cells received from input ports L01 to L0N, a cell copy section 3a for producing copies of a broadcast cell, a shared buffer memory section 4 for storing therein the multiplexed ATM cells for each output port, a demultiplexer 5 for demultiplexing ATM cells read from the memory 4 and distributing the obtained items to output ports L91 to L9N, and a buffer memory control section 6 for controlling a read address (RA) and a write address (WA) of the memory 4 and thereby controlling the ATM cells for the respective output ports L91 to L9N.

In addition, the cell copy section 3a includes a copy FIFO buffer 31 for storing therein the ATM cells inputted via the input ports L01 to L0N, a routing information adding unit 32 for adding routing information to each copied broadcast cell, a copy controller 33 for generating copies of a broadcast cell, a copy information table 34 for keeping therein the number of copies to be created and the routing information, a cell FIFO buffer 35 for storing therein non-broadcast cells, and a selector 36 for achieving selection between the non-broadcast and broadcast cells.

Moreover, the buffer memory control section 6 includes a port selecting decoder 61 for designating, according to the routing information contained in the additional header of the ATM cell, a write address register (WAR) corresponding to an output port, write address registers (WAR's) 621 to 62N for indicating write addresses WA's of the memory 4, read address registers (RAR's) 631 to 63N for indicating read addresses RA's of the memory 4, an idle address FIFO buffer 64 for reading therefrom a next write address NWA and for writing therein a read address RA, an output selecting decoder 65 for selecting a read address register (RAR) associated with an output port number, and an output counter 66 for designating an output port number.

Referring now to FIG. 5, description will be given of the copy operation of the broadcast cell by the copy section 3a. Assume that the section 3a receives a broadcast cell C2a and a non-broadcast cell C2b via the line L2. If the copy information table 34 contains routing information items a to d, the copy section 3a produces four copies C2a1, C2a2, C2a3, and C2a4 of the broadcast cell C2a and adds routing information items a to d respectively to the copied cells C2a1, C2a2, C2a3, and C2a4. The buffer 35 is a buffer for storing therein non-broadcast cell. When the buffer 35 contains at least a non-broadcast cell, the controller 33 instructs the selector 36 to deliver the non-broadcast cell to the line L3. When the buffer is empty, the controller 33 causes the selector 36 to transmit the broadcast cells to the line L3. Consequently, even when the copy operation of the broadcast cell is in process, when a non-broadcast cell C2b is inputted, the system preferentially transmits the non-broadcast cell C2b. Namely, the broadcast cells are fed to the line L3, for example, at an idle timing after the non-broadcast cells are entirely transferred to the line L3. In short, the ATM cells are sent to the line L3 in a sequence of the broadcast cell C2a1, the non-broadcast cell C2b, and the broadcast cells C2a2, C2a3, and C2a4.

Figure 6:
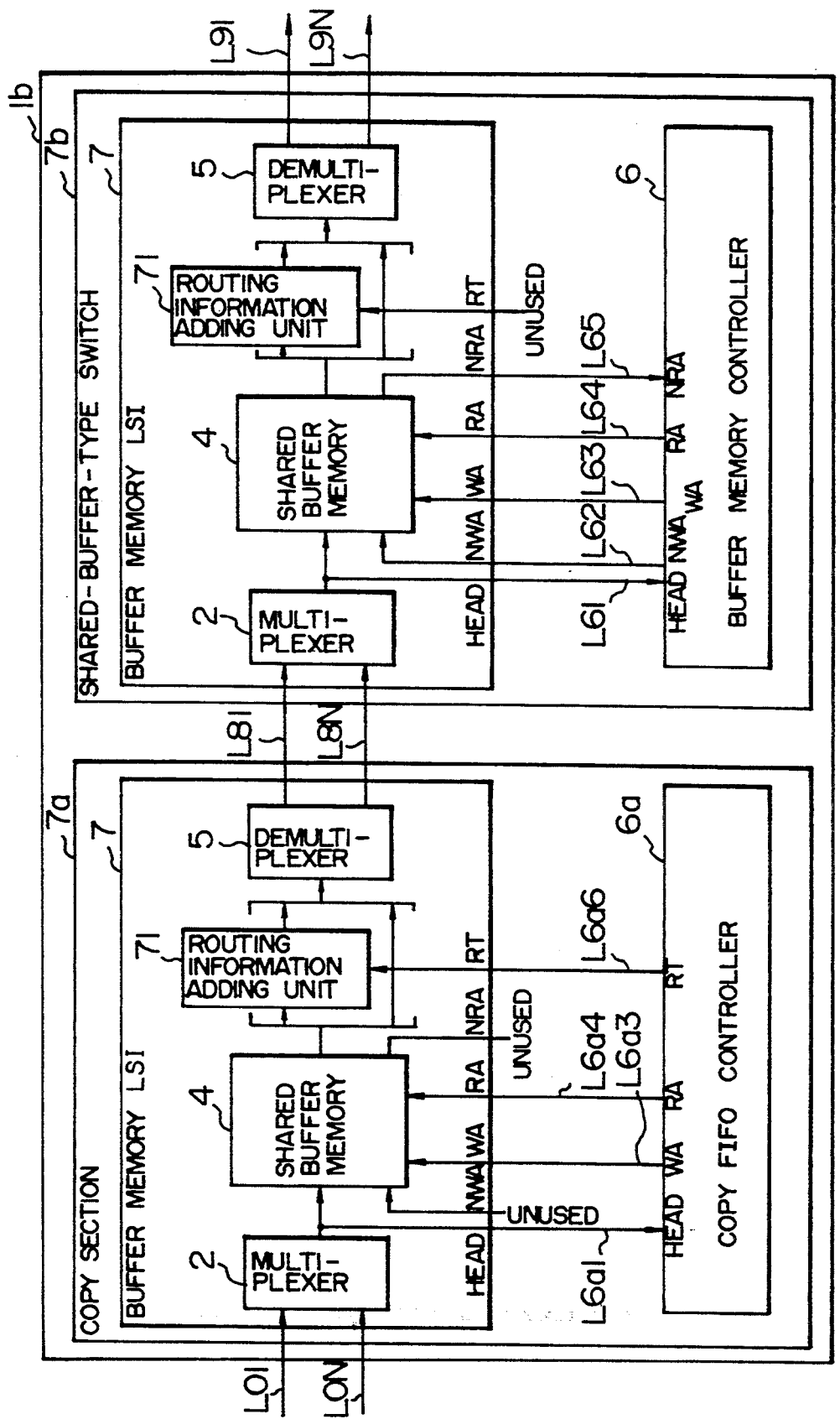
FIG. 6 is a diagram showing the structure of a shared-buffer-type ATM switch having a copy function in a third embodiment according to the present invention.
Figure 7:
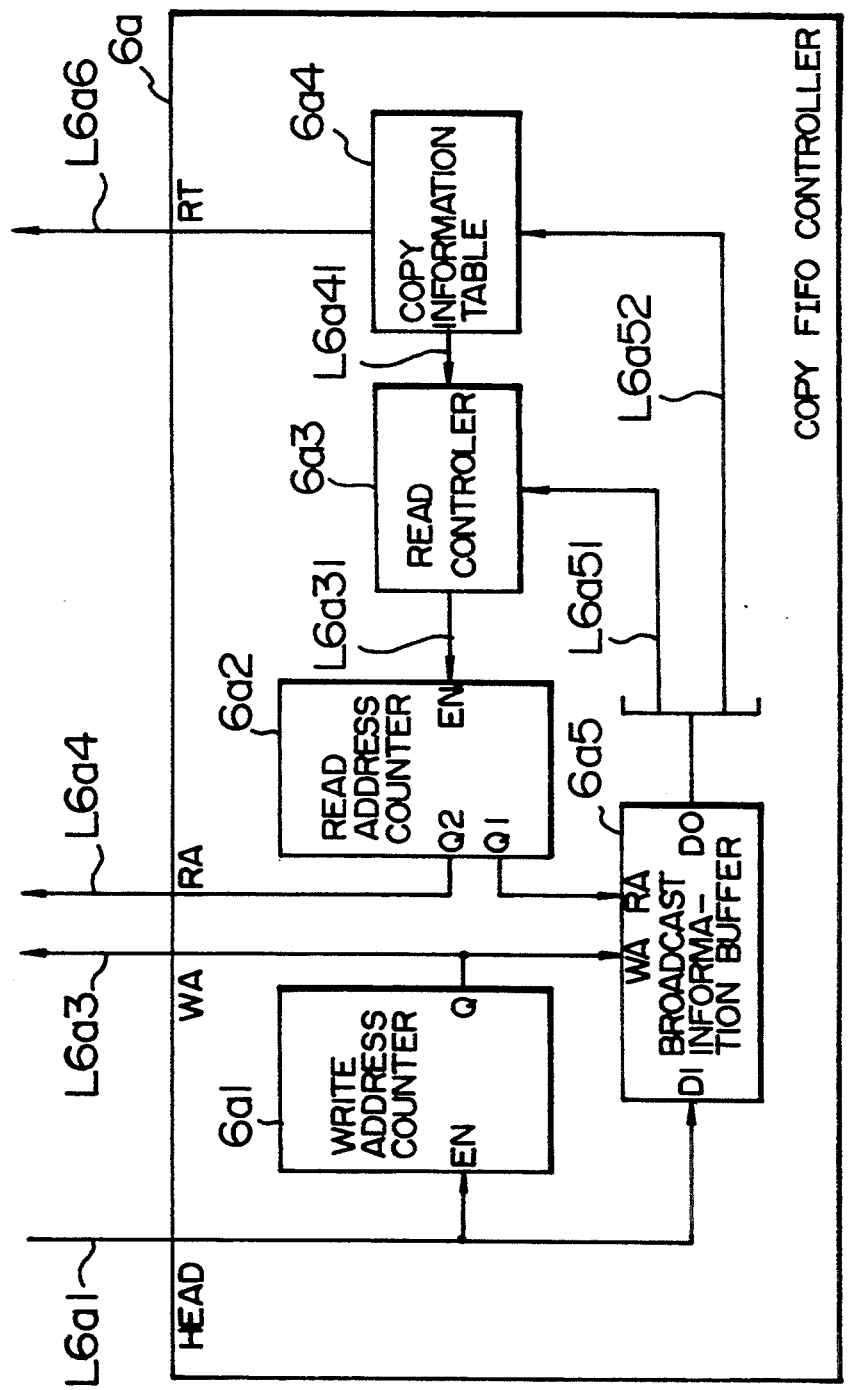
FIG. 7 is a diagram useful to explain operation of a copy first-in first-out (FIFO) section of the buffer-type ATM switch in the third embodiment according to the present invention.

Subsequently, a third embodiment of the present invention will be described by reference to FIGS. 6 and 7. FIG. 6 shows the constitution of a shared-buffer-type ATM switch having a copy function in a third embodiment of the present invention. FIG. 7 shows the structure of a copy FIFO control section of the ATM switch.

The construction of the ATM switch will be described by reference to FIG. 6. The switch 1b includes a copy section 7a for generating copies of a broadcast cell and a switch section 7b of a shared buffer type 7b for carrying out a switching function. The copy section 7a includes a buffer memory large scale integrated (LSI) device 7 for storing therein ATM cells and a copy FIFO control section 6a for controlling the copy operation of the broadcast cell. Moreover, the switch section 7b includes the buffer memory LSI 7 and a buffer memory control section 6 for distributing each of the ATM cells to an output port associated therewith according to routing information contained in an additional header thereof, thereby delivering the cell to the output port. In each of the sections 7a and 7b, the buffer memory 7 includes a multiplexer 2 for multiplexing ATM cells received from input ports L01 to L0N, a shared buffer memory section 4 for storing therein the ATM cells, a routing information adding unit 71 for adding routing information to each ATM cell, and a demultiplexer 5 for demultiplexing ATM cells and distributing the obtained items to output ports L91 to L9N.

Description will now be given of a mode of operation of the memory device 7 in each of the sections 7a and 7b. When an ATM cell is a broad cast cell, the controller 6a of the section 7a controls the memory device 7 to read therefrom the identical cell n times, where n is specified by the routing information, thereby preparing copies of the cell. The controller 6a controls the unit 71 to add, to each copied cell, routing information denoting an output port so as to deliver the cell via the demultiplexer 5 to one of the output ports L81 to L8N. Moreover, the controller 6 of the section 7b controls the memory device 7 to store ATM cells inputted via the lines L81 and L8N and the multiplexer 2 in the memory 4 and to distribute the cells to the associated output ports L91 to L9N according to the routing information. In this operation, the demultiplexer 5 of the section 7 and the multiplexer 2 of the section 7b are mutually cancelled out. In the section 7b, since the function to copy a broadcast cell is unnecessary and hence the unit 71 is set to an unused state. As above, the memory LSI device 7 can be manufactured in the same circuit structure for the sections 7a and 7b, there can be used an identical type of LSI device for the memory 7.

Referring now to FIG. 7, description will be given of the constitution of the copy FIFO control section 6a of the ATM switch in the third embodiment according to the present invention. The section 6a includes a write address counter 6a1 which is an upcounter for controlling a write address WA of the memory 4 of the memory device 7, a read address counter 6a2 which is an up-counter for controlling a read address RA of the memory 4 of the memory device 7, a broadcast information buffer 6a5 for storing therein header information of an ATM cell, a copy information table 6a4 for storing therein the number of copies and routing information, and a read controller 6a3 for controlling the copy operation of a broadcast cell.

Next, description will be given of a method of controlling addresses of the memory 4 of the memory device 7 by the controller 6. Header information of an ATM cell inputted to the memory device 7 is fed via a line L6a1 to the controller 6a. When the ATM is assumed to be valid according to the header information, the counter 6a1 sends a write address (WA) via a line L6a3 to the memory device 7, thereby storing the header information of the ATM cell according to the same write address in the buffer 6a5. In this operation, the counter 6a1 updates the value of the write address. In this connection, when the ATM cell is empty according to the header information, the counter 6a1 does not update the write address value.

On the other hand, to read an ATM cell from the memory device 7, the counter 6a2 outputs a read address from an input terminal Q1 to the buffer 6a5. The buffer 6a5 outputs to a line L6a51 a cell type identifier denoting whether the cell stored in the memory 4 is a broadcast cell or a non-broadcast cell. Moreover, the buffer 6a5 delivers to a line La52 copy information to reference a table necessary to add routing information. The controller 6a3 inputs via a line 6a41 the cell type identifier via the line L6a51 and copy count information outputted from the copy information table via the line 6a41 and then creates read enable information, thereby sending the information via a line L6a31 to the counter 6a2. In response to the read enable information, when the pertinent cell to be outputted is a broadcast cell, the cell is repeatedly read therefrom to obtain the number of copies as specified by the copy count. Without enabling an update of the read address counter, the same read address RA is transferred from an output terminal Q2 via a lien L6a4 to the memory device 7. Thereafter, the counter 6a2 is updated. Moreover, when the pertinent cell is a non-broadcast cell, the counter 6a2 reads the cell only once and sends the address RA via the line L6a4 to the memory LSI device 7, thereby updating the value of the counter 6a2. In this situation, the output Q1 causes the buffer 6a5, the table 6a4, and the controller 6a3 to achieve operation such that the output Q2 of the counter 6a2 outputs a read address RA identical to that delivered from the output Q1 at a timing synchronized with arrival of an update enable signal L6a31 at an EN input terminal of the counter 6a2. The table 6a4 supplies the adding unit 71 via a line L6a6 with routing information RT so that the adding unit 71 adds the routing information denoting an output port number to each copied broad cast cell.

Figure 8:
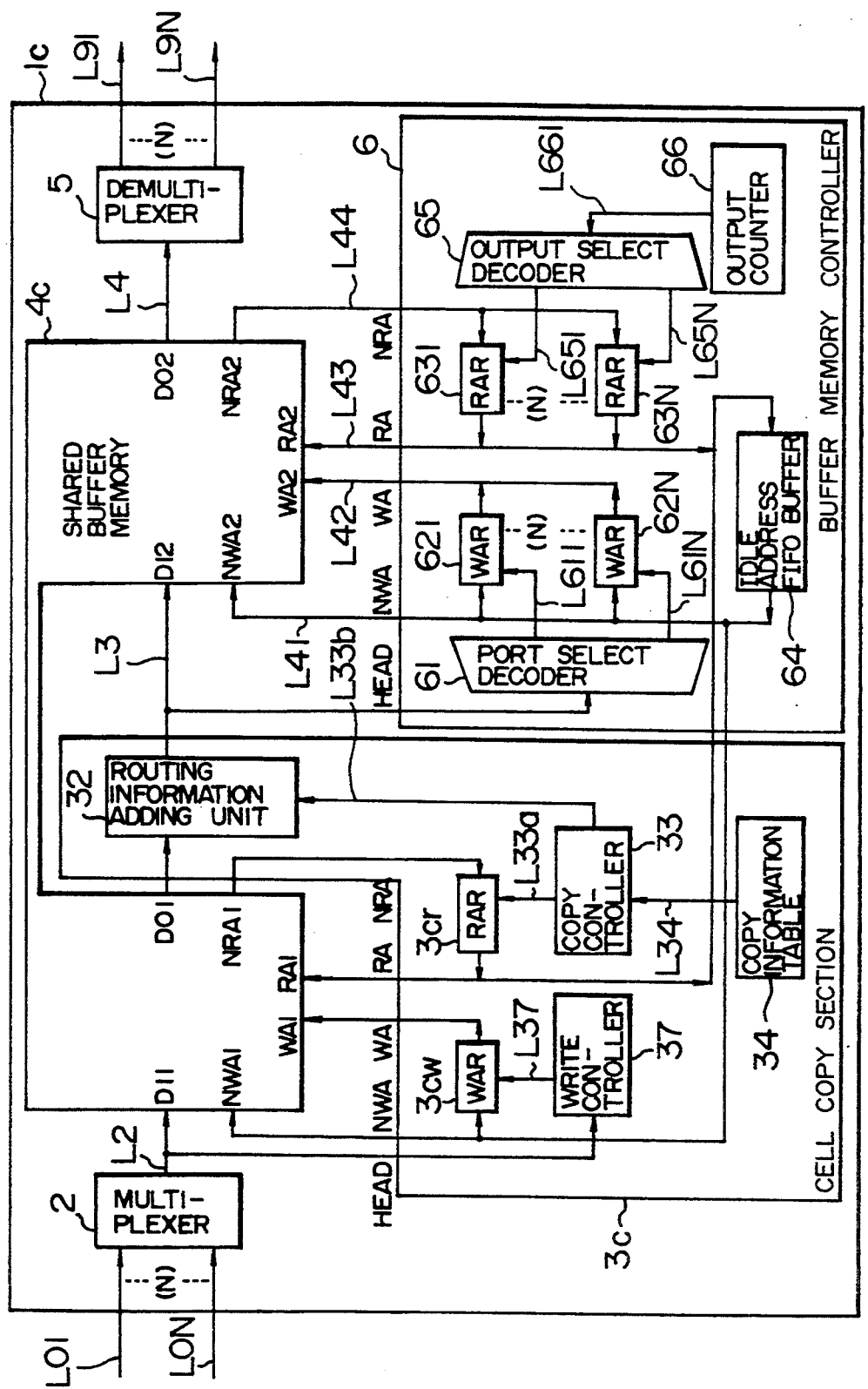
FIG. 8 is a diagram schematically showing the construction of a shared-buffer-type ATM switch having a copy function in a fourth embodiment according to the present invention.
Figure 9:
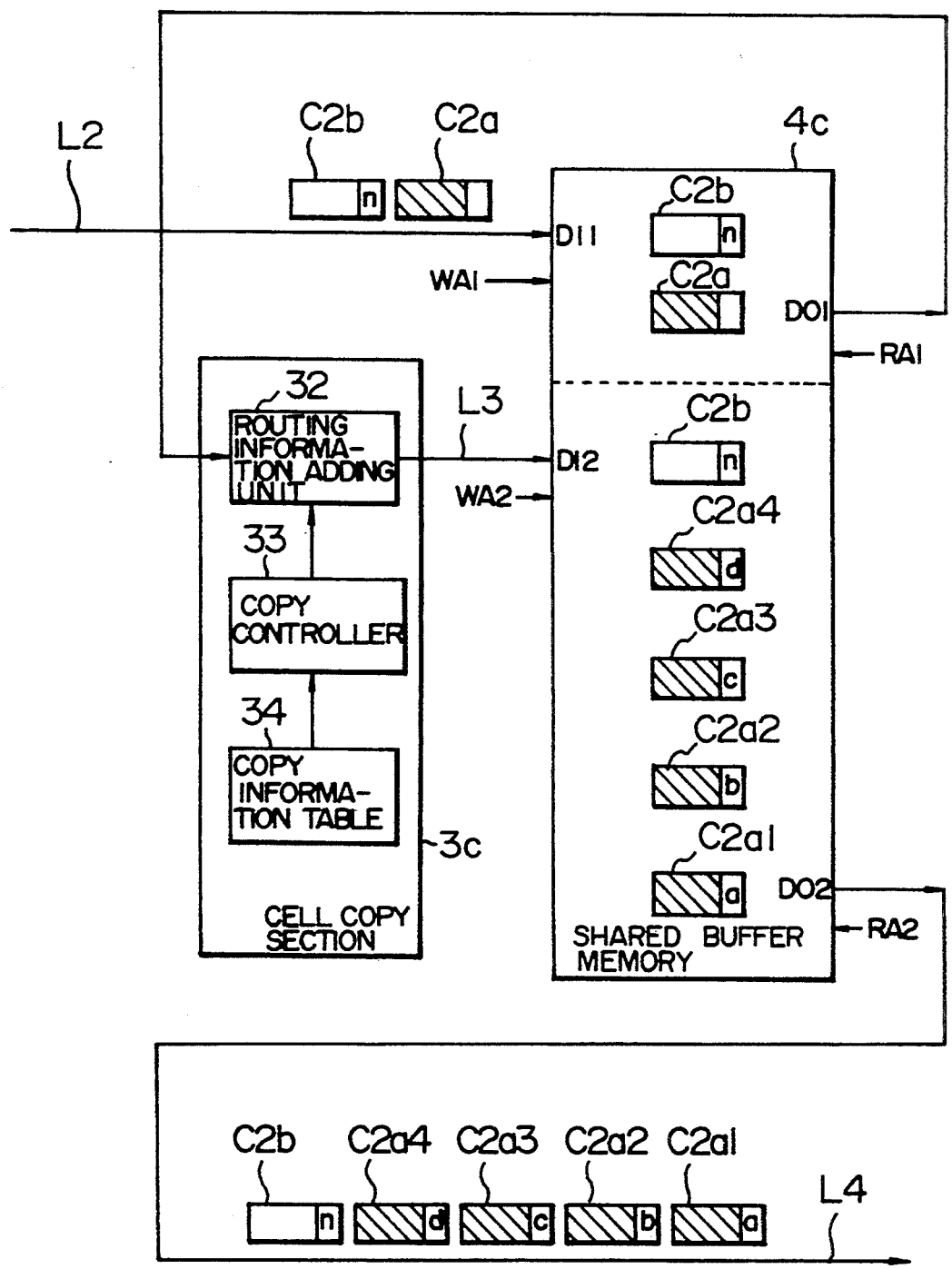
FIG. 9 is a diagram useful to explain a cell copy operation in the buffer-type ATM switch in the fourth embodiment according to the present invention.
Figure 10:
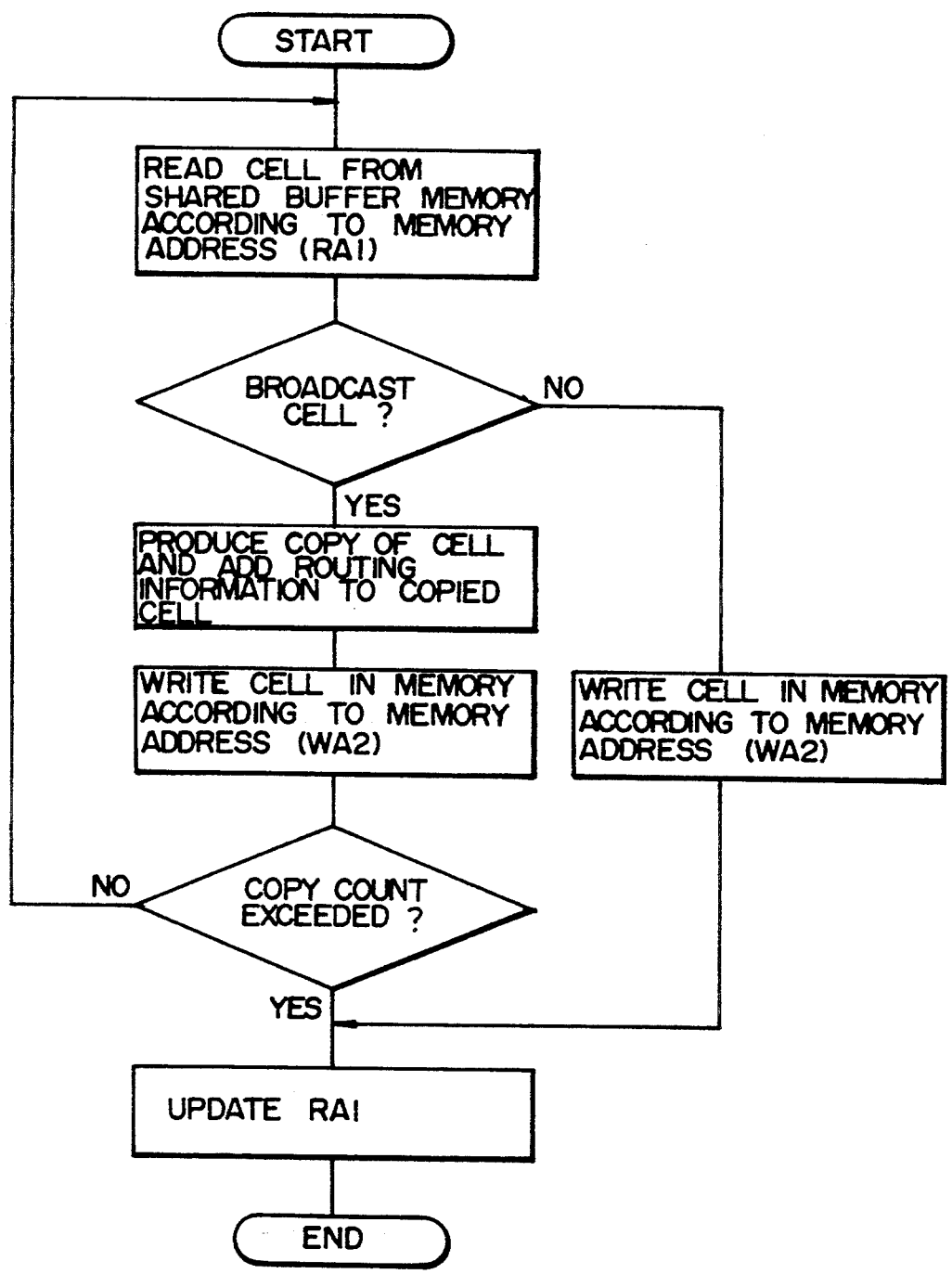
FIG. 10 is a flowchart of the ATM cell copy operation in the buffer-type ATM switch in the fourth embodiment according to the present invention.

Referring next to FIGS. 8 to 10, a fourth embodiment of the present invention will be described. FIG. 8 shows the configuration of a shared-buffer-type ATM switch having a copy function in a fourth embodiment according to the present invention. FIG. 9 shows a cell copy operation of the ATM switch. FIG. 10 shows a flow of the cell copy operation of the ATM switch.

The construction of the ATM switch will now be described by reference to FIG. 8. The switch 1c includes a multiplexer 2 for multiplexing ATM cells received from input ports L01 to L0N, a cell copy section 3a for producing copies of a broadcast cell, a shared buffer memory section 4c for storing therein the multiplexed ATM cells for each output port, a demultiplexer 5 for demultiplexing ATM cells read from the memory 4c and distributing the obtained items to output ports L91 to L9N, and a buffer memory control section 6 for controlling a read address and a write address of the memory 4c and thereby controlling the ATM cells for the respective output ports L91 to L9N.

In addition, the memory section 4c includes a multi-port memory device. In operation of the section 4c, an input DI1 and a next write address NWA1 are stored therein in response to a first write address WA1, an output DO1 and a next read address NRA1 are read out therefrom in response to a first read address RA1, an input DI2 and a next write address NWA2 are stored therein in response to a second write address WA2, and an output DO2 and a next read address NRA2 are read therefrom in response to a second read address RA2.

Furthermore, the cell copy section 3c includes a write controller 37 for storing the ATM cells inputted from the input ports in the memory 4c, a write address register (WAR) 3cw for indicating a write address WA1, a routing information adding unit 32 for adding routing information to each copied broadcast cell, a copy control unit 33 for creating copies of a broadcast cell, a read address register (RAR) 3cr for designating a read address RA1, and a copy information table 34 for keeping therein the copy count and routing information of the broadcast cell.

Furthermore, the buffer memory controller 6 includes a port selecting decoder 61 for designating, according to the routing information contained in the additional header of the ATM cell, a write address register (WAR) corresponding to an output port, write address registers (WAR's) 621 to 62N for indicating write addresses WA's of the memory 4, read address registers (RAR's) 631 to 63N for indicating read addresses RA's of the memory 4, an idle address FIFO buffer 64 for reading therefrom next write addresses NWA1 and NWA2 and for writing therein read addresses RA1 and RA2, an output selecting decoder 65 for selecting a read address register (RAR) associated with an output port number, and an output counter 66 for designating an output port number.

Referring now to FIG. 9, description will be given of the copy operation of the broadcast cell.

Assume that the section 3a receives a broadcast cell C2a and a non-broadcast cell C2b via the line L2 to store the cells in an area denoted by the write address WA1 of the memory section 4c. Next, a cell is read therefrom according to the read address RA1. When the pertinent cell is a broadcast cell and if the copy information table 34 contains routing information items a to d, the copy section 3a produces four copies C2a1, C2a2, C2a3, and C2a4 of the broadcast cell C2a and adds routing information items a to d respectively to the copied cells C2a1, C2a2, C2a3, and C2a4, thereby writing the cells via the line L3 in the memory 4c according to an address indicated by the write address WA2. Thereafter, the cells are read therefrom according to the read address RA to be outputted to a line L4. The ATM cells are sent to the line L4 in a sequence of the broadcast cells C2a1, C2a2, C2a3, and C2a4 and the non-broadcast cell C2b.

Referring now to FIG. 10, the flow of the copy of the broadcast cell will be described.

The memory 4c is accessed to read therefrom a cell according to the read address RA1. The copy section 3c judges to determine whether the cell is a broadcast cell or a non-broadcast cell. When the cell is a broadcast cell, there are produced copies of the cell. The number of copies is denoted by the copy count. Routing information is added to each copied cell. Thereafter, the cell is written in the memory section 4c according to the write address WA2. Moreover, when the pertinent cell is a non-broadcast cell, the cell is written in the memory 4c according to the write address WA2 without achieving the copy operation.

Through the above operation, the broadcast cell supplied via the input port is subjected to a copy operation in the cell copy section 3c to be stored in the memory 4c. The stored cells are thereafter read from the memory 4c to be distributed to the respective output ports L91 to L9N, thereby implementing the broadcast function.

Figure 11:
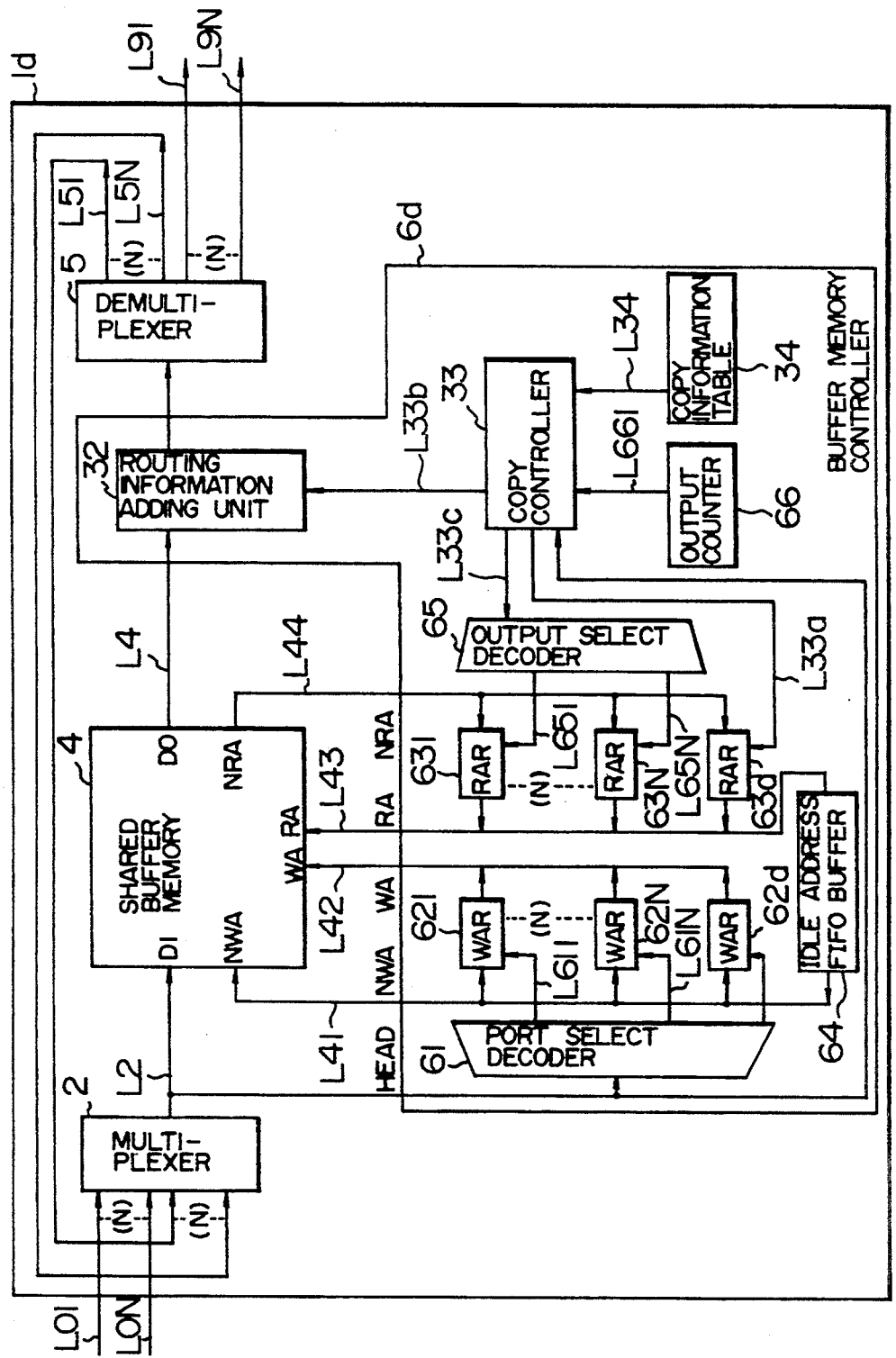
FIG. 11 is a schematic diagram showing the configuration of a shared-buffer-type ATM switch having a copy function in a fifth embodiment according to the present invention.
Figure 12:
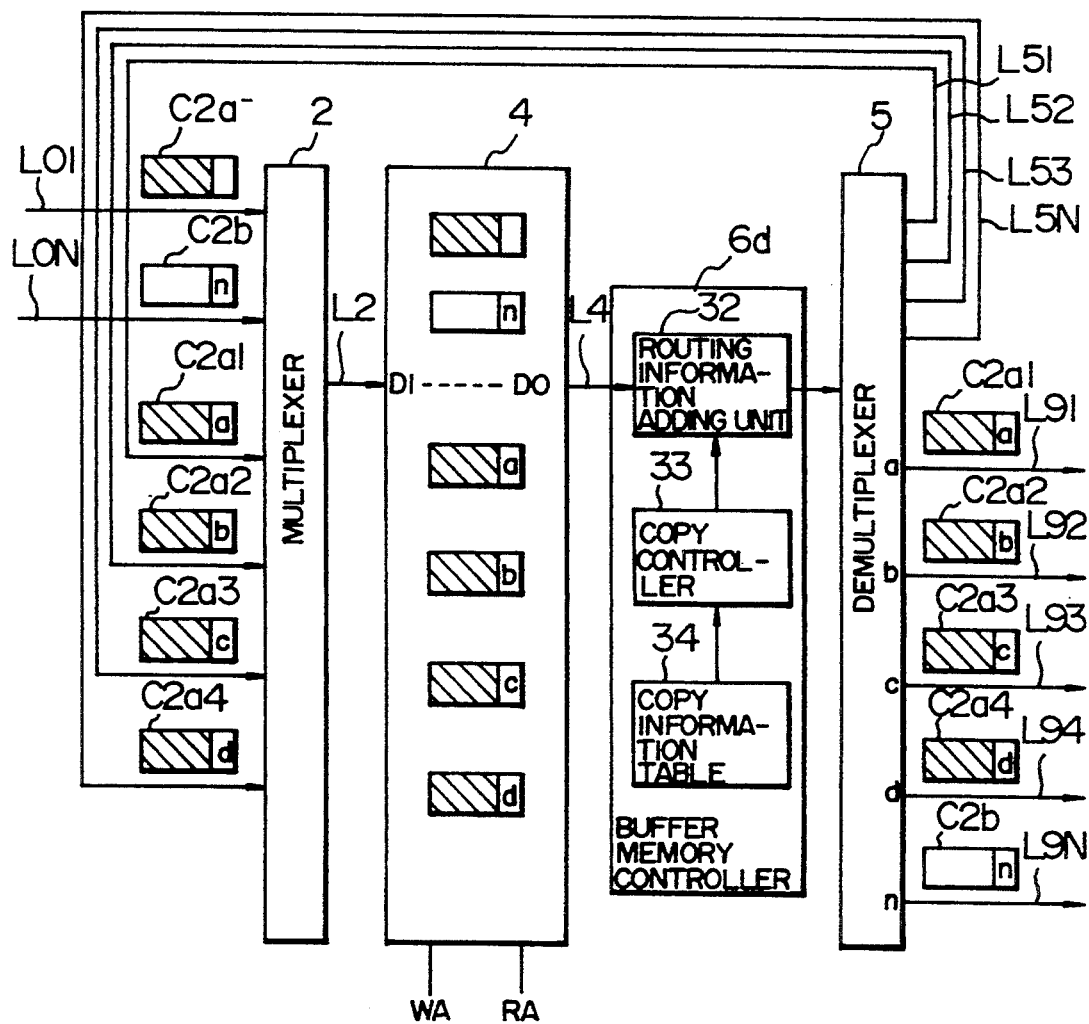
FIG. 12 is a diagram for explaining a cell copy operation in the buffer-type ATM switch in the fifth embodiment according to the present invention.
Figure 13:
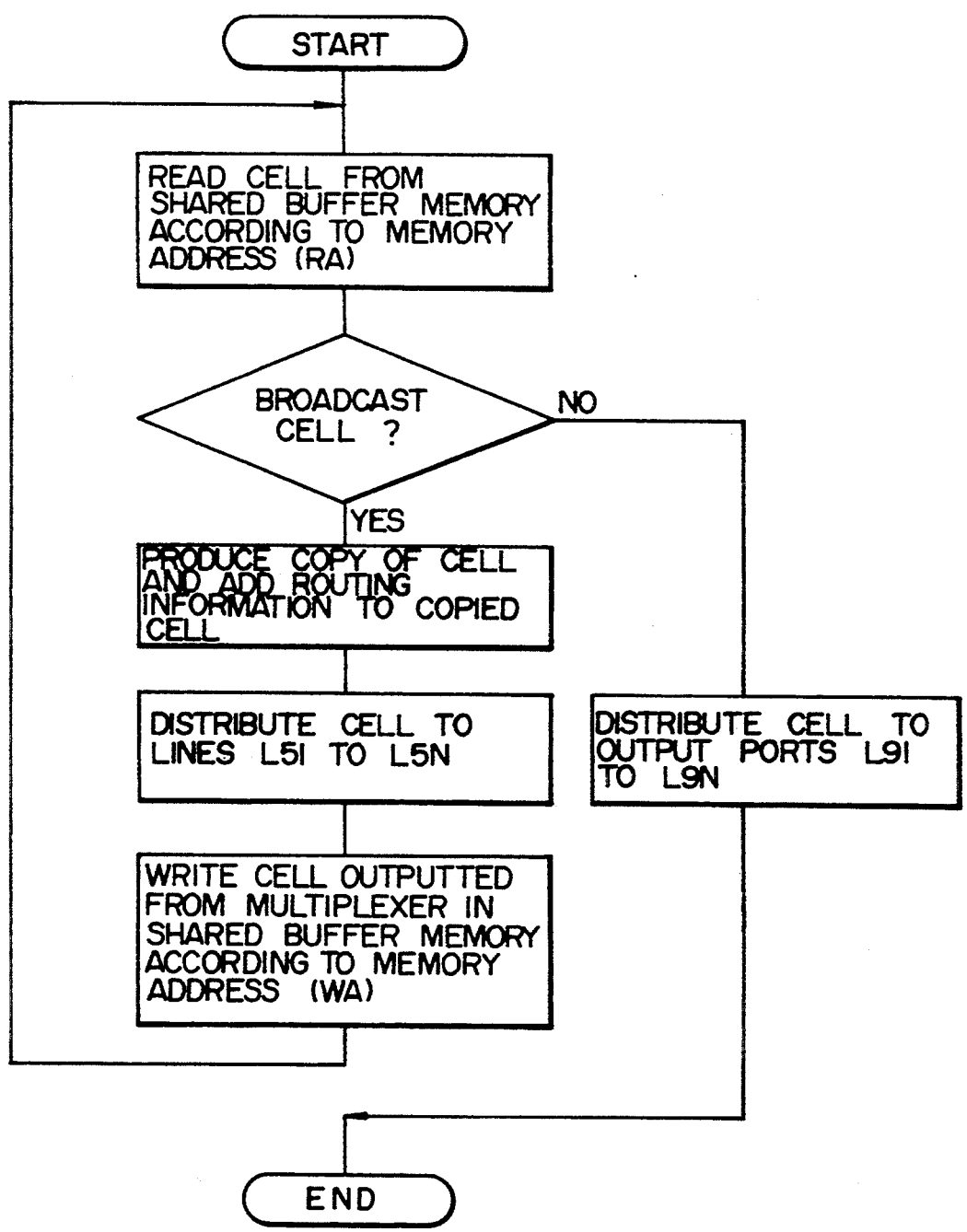
FIG. 13 is a flowchart of the ATM cell copy operation in the buffer-type ATM switch in the fifth embodiment according to the present invention.

Next, a fifth embodiment of the present information will be described by reference to FIGS. 11 to 13. FIG. 11 shows the configuration of a shared-buffer-type ATM switch having a copy function in a fifth embodiment according to the present invention. FIG. 12 shows a cell copy operation of the ATM switch. FIG. 13 is a flowchart of the cell copy operation of the ATM switch.

Referring now to FIG. 11, the construction of the ATM switch will be described. The switch 1d includes a multiplexer 2 for multiplexing ATM cells received from input ports L01 to L0N, a shared buffer memory section 4 for storing therein the multiplexed ATM cells for each output port, a demultiplexer 5 for demultiplexing ATM cells read from the memory 4 and distributing the obtained items to lines L51 to L5N and output ports L91 to L9N, and a buffer memory control section 6 for controlling a read address (RA) and a write address (WA) of the memory 4 and thereby controlling the ATM cells for the respective output ports L91 to L9N.

Moreover, the buffer memory control section 6 includes a port selecting decoder 61 for designating, according to the routing information contained in the additional header of the ATM cell, a write address register (WAR) corresponding to an output port, write address registers (WAR's) 621 to 62N and 62d for indicating write addresses (WA's) of the memory 4, read address registers (RAR's) 631 to 63N and 63d for indicating read addresses (RA's) of the memory 4, an idle address FIFO buffer 64 for reading therefrom a next write address (NWA) and for writing therein a read address (RA), an output selecting decoder 65 for selecting a read address register (RAR) associated with an output port number, and an output counter 66 for designating an output port number. In addition, to achieve the cell copy operation, there are disposed a routing information adding unit 32 for adding routing information to each copied broadcast cell, a copy controller 33 for controlling the copy operation of a broadcast cell, and a copy information table 34 for keeping therein a copy count of a broadcast cell and routing information.

The copy operation of a broadcast cell will now be described by reference to FIG. 12.

A broadcast cell C2a inputted from the input port L01 and a non-broadcast cell C2b supplied via the input port L02 are multiplexed by the multiplier 2 to be stored via a line L2 in the memory 4 at a write address WA denoted by the write address register WAR. Thereafter, the non-broadcast cell C2b is read therefrom according to a read address RA indicated by one of the read address registers RAR's 631 to 63N to be distributed by the demultiplexer 5 to one of the output ports L91 to L9n. In this embodiment, the cell C2b is delivered to the port L9N corresponding to the routing information n. Furthermore, the broadcast cell C2a is read therefrom according to a read address RA designated by the read address register (RAR) 63d. Assume that the copy information table 34 contains routing information items a to d. The broadcast cell C2a is transmitted to the unit 32 in which the routing information items a to d are respectively added to four copied cells C2a to respectively produce cells C2a1 to C2a4, thereby transmitting the cells C2a1 to C2a4 to the lines L51 to L54, respectively. The cells on the lines L51 to L5N are multiplexed again by the multiplexer 2 to be stored via the line L2 in the memory 4 according to an address indicated by the write address WA. Thereafter, these cells are read from the memory 4, like in the case of the non-broadcast cells, according to a read address RA indicated by the read address registers RAR 631 to 63N so as to distribute the obtained cells by the demultiplexer 5 to the output ports L91 to L9N. In this embodiment, the cells C2a1 to C2a4 are respectively distributed to the output ports L91 to L94 respectively associated with the routing information items a to d. In general, a non-broadcast cell once stored in the shared buffer memory is immediately distributed to an associated output port. However, a broadcast cell once stored in the shared buffer memory is subjected to a copy operation to obtain a plurality of copies thereof so as to be again stored in the memory. Thereafter, the cells are distributed to the associated output ports.

As above, according to the embodiment above, the lines L51 to L5N are arranged between the demultiplexer 5 and the multiplexer 2 so as to distribute a broadcast cell to a plurality of lines, thereby achieving a copy operation of the broadcast cell. In this regard, it may also be possible to separate the lines L51 to L5N establishing connections between the demultiplexer 5 and the-multiplexer 2 such that the sides respectively of the multiplexer 2 and the demultiplexer 5 are respectively assigned to the input and output ports and N write address registers WRA's and N read address registers RAR's are disposed in association with the output ports, thereby implementing a shared-buffer-type ATM switch. In the switch, although the broadcast function cannot be developed, there can be arranged inputs and outputs respectively twice those of the embodiment above, which will be easily appreciated from the configuration of the embodiment.

Referring next to FIG. 13, description will be given of the operation flow of the copy operation of the broadcast cell.

From the memory 4, a cell is read according to the read address RA. Under control of the buffer memory controller 6d, for a timing of a broadcast cell, the cell is repeatedly read therefrom to prepare copies thereof. The number of copies is designated by the copy count. Routing information is added to each copied cell. The cells are then distributed via the demultiplexer 5 to the lines L51 to L5N so as to be written via the multiplexer 2 in the memory 4 according to the write address WA. On the other hand, for a timing of a non-broadcast cell, the cell is distributed via the demultiplexer 5 to the output ports L91 to L9N for transmission thereof.

Referring now to FIG. 11, description will be given of an address control method adopted by the controller 6d to control addresses of the memory 4. ATM cells inputted via the input ports L01 to L0N and the lines L51 to L5N are multiplexed by the multiplexer 2 to be stored in the memory 4. In this operation, routing information of an additional header field of each ATM cell is decoded by the port selecting decoder 61 such that a value of a write address register WAR corresponding to an output port number thus decoded is sent as a write address WA via the line L42 to the memory 4. In this situation, a next write address NWA is outputted from the idle address FIFO buffer 64 to be stored in the memory 4 according to an address identical to that of the ATM cell therein. Moreover, the address NWA is also stored in the write address register WAR which has outputted the write address WA.

On the other hand, a cell acquired from the memory 4 associated with a timing of a non-broadcast cell is distributed by the demultiplexer 5 to the output ports L91 to L9N designated by the output counter 66. The counter 66 indicates an output port number via the line L661 to the copy controller 33 such that the signal denoting the number is delivered via the line L33c to the output selecting decoder 65 to be decoded therein. A read address register RAR corresponding to an output port determined as a result of the decoding operation is accessed to read therefrom a read address RA, thereby transmitting the address RA via the line L43 to the memory 4. In this operation, a cell and a next read address NRA are read from the memory 4. The read address RA is stored in the buffer 64, whereas the next read address NRA is stored in the read address register RAR which has outputted the read address RA.

Furthermore, when there exists a cell which is to be read from the memory 4 and which is associated with a timing of a broadcast, the cell is read from the memory 4 according to the contents of the broadcast read address register RAR 63d. Routing information is added to the cell by the adding unit 32 so as to send the resultant cell to the demultiplexer 5. When the copy operation to generate copies according to the copy count is finished, the contents of the register RAR 63d are updated.

In the embodiment, through a sequence of operations, there is developed a broadcast function in which a broadcast cell received from an input port is distributed to the respective output ports.

According to the present invention, in a shared-buffer-type ATM switch, there are produced copies of a broadcast cell by a cell copy section. The number of copies is denoted by a copy count. Routing information of an output port is added to each copied cell by a routing information adding unit so as to store the resultant cell in a shared buffer memory. On an output side of the memory, ATM cells stored therein are sequentially read therefrom according to indication of an output counter. As a result, a broadcast cell is distributed to a plurality of output ports, thereby advantageously implementing a broadcast function.

In addition, in an output port designating cycle of the output counter, broadcast and non-broadcast cells can be read from the memory without necessitating discrimination therebetween, which leads to an advantageous effect that a high-throughput switch can be implemented.

Furthermore, since the switch section and the cell copy section can be constructed in an identical hardware structure, the production cost of the switch is advantageously lowered. Moreover, the shared buffer memory of the switch and the copy FIFO buffer of the cell copy section can be configured as a common buffer memory. The buffer memory can be efficiently utilized and the cell loss ratio can be reduced also for traffic having a high bursty.

While particular embodiments of the invention have been shown and described, it will be obvious to those skilled in the art that various changes and modifications may be made without departing from the present invention in its broader aspects.

We claim:

1. A shared-buffer-type ATM switch comprising:
   a multiplexer for multiplexing ATM cells inputted from input ports;
   a shared buffer memory section for storing therein the multiplexed ATM cells;
   a demultiplexer for demultiplexing ATM cells read from the shared buffer memory section and transmitting the demultiplexed ATM cells to output ports;
   a buffer memory control section for writing and reading ATM cells in and from the shared buffer memory section; and
   a cell copy section disposed between the multiplexer and the shared buffer memory section for producing copies of a broadcast cell;
   wherein the cell copy section includes:
   a copy FIFO buffer for temporarily storing therein ATM cells,
   a copy information table for storing routing information from which copy count information is obtained,
   a routing information adding unit, coupled to said copy FIFO buffer for adding routing information to ATM cells output from said copy FIFO buffer, and
   a copy controller, coupled to said copy FIFO buffer, said copy information table and said routing information adding unit, for achieving a copy operation of an ATM cell,
   wherein a broadcast cell is subjected to a copy operation according to copy count information and routing information associated with an output port is added to each copied cell.

2. A shared-buffer-type ATM switch comprising:
   a multiplexer for multiplexing ATM cells inputted from input ports;
   a shared buffer memory section for storing therein the multiplexed ATM cells;

a demultiplexer for demultiplexing ATM cells read from the shared buffer memory section and transmitting the demultiplexed ATM cells to output ports;

a buffer memory control section for writing and reading ATM cells in and from the shared buffer memory section; and a cell copy section disposed between the multiplexer and the shared buffer memory section for producing copies of a broadcast cell;

wherein the cell copy section includes:

a cell FIFO buffer for temporarily storing therein ATM cells, a copy FIFO buffer for temporarily storing therein a broadcast cell, a copy information table for storing routing information from which copy count information is obtained, a routing information adding unit, coupled to said copy FIFO buffer, for adding the routing information to a cell, a copy controller, coupled to said cell FIFO buffer, said copy FIFO buffer and said routing information adding unit, for achieving a copy operation of an ATM cell, and a selector, coupled to said routing information adding unit and said copy controller, for achieving a selection between a non-broadcast cell and a broadcast cell according to an indication from the copy controller, wherein the non-broadcast cell is transmitted; and wherein the broadcast cell is subjected to a copy operation at a timing such as a timing of an idle cell and routing information associated with an output port is added to each copied cell.

3. A shared-buffer-type ATM switch comprising:

a multiplexer for multiplexing ATM cells inputted from a plurality of input ports and outputting multiplexed cells;

a shared buffer for storing therein the multiplexed cells;

a demultiplexer for demultiplexing cells read out from the shared buffer and sending demultiplexed cells to output ports;

a cell copy section provided between an output of said multiplexer and an input of said shared buffer for producing a predetermined number of copies of a broadcasting cell from said multiplexer and storing copied cells in said shared buffer; and a buffer control section for controlling writing and reading of cells from said cell copy section to said shared buffer.

4. A shared-buffer-type ATM switch as set forth in claim 3, wherein said cell copy section stores non-broadcasting cells received from said multiplexer in said shared buffer.

5. A shared-buffer-type ATM switch as set forth in claim 3, wherein said cell copy section includes:

buffer means for temporarily storing therein the ATM cells received from said multiplexer;

detection means for determining whether the received ATM cell in a broadcasting or non-broadcasting cell on the basis of a header of the cell inputted from said multiplexer into said buffer means;

copy means for reading out from the buffer means the cell determined to be a broadcasting cell within the buffer means and for producing a predetermined number of copies of the cell; and header conversion means for converting the header of the copies of the broadcasting cell and outputting the copied cells to said shared buffer.

6. A shared-buffer-type ATM switch as set forth in claim 3, wherein said cell copy section includes:

buffer means for temporarily storing therein the ATM cells received from said multiplexer;

detection means for determining whether the received ATM cell whether is a broadcasting or non-broadcasting cell on the basis of a header of the cell inputted from said multiplexer into said buffer means;

a table for storing therein routing information which is used to obtain the number of copies of the broadcasting cell corresponding to said predetermined number;

copy means for reading out from the buffer means the cell determined a broadcasting cell within the buffer means and for producing said predetermined number of copies of the cell; and header conversion means for writing the routing information of said table to the copied broadcasting cells and outputting the copied cells to said shared buffer.

7. A shared-buffer-type ATM switch as set forth in claim 6, wherein said buffer means causes the cells from said multiplexer to be temporarily stored within said buffer means during copying operation of the broadcasting cell.

8. A shared-buffer-type ATM switch as set forth in claim 3, wherein said cell copy section includes:

first buffer means for temporarily storing therein non-broadcasting ones of the ATM cells received from said multiplexer;

second buffer means for temporarily storing therein broadcasting ones of the ATM cells received from said multiplexer;

a table for storing therein routing information which is used to obtain the number of copies of the broadcasting cell corresponding to said predetermined number;

copy means for reading out the broadcasting cell of said second buffer means from said second buffer means and producing copies thereof based on the corresponding copy number of said table;

routing information writing section for writing the routing information in the copied cells and outputting the copied cells; and a selector for selectively providing to said shared buffer the non-broadcasting cell received from said first buffer means and the broadcasting cell received from said routing information writing section.

9. A shared-buffer-type ATM switch as set forth in claim 8, wherein said selector provides to said shared buffer the non-broadcasting cell preferentially over the broadcasting cell.

10. A shared-buffer-type ATM switch as set forth in claim 8, wherein said copy means produces copies of said broadcasting cell at idle timing corresponding to idle ones of the ATM cells received from said multiplexer.

11. A shared-buffer-type ATM switch according to claim 8, wherein said first buffer means and said second buffer means share said shared buffer.

12. An ATM switching system for handling a plurality of fixed-length cells including non-broadcast cells and broadcast cells, each fixed-length cell including a header section and a data section, and for exchanging a communication message contained in the data section of the cell between a plurality of incoming highways and a plurality of outgoing highways according to the data contained in the header section of the cell, comprising:

means for multiplexing cells inputted from said plurality of incoming highways and outputting multiplexed cells;

a cell copy section for outputting a non-broadcast cell of cells from said multiplexing means and for producing a predetermined number of copies of a broadcast cell of cells from said multiplexing means and outputting the copied cells;

a shared buffer having addressable storage locations for storing cells output from said cell copy section;

means for demultiplexing and distributing cells output from said shared buffer among said plurality of outgoing highways;

memory means for storing an idle address of an idle storage location of said shared buffer; and means for controlling write and read operations of said shared buffer in accordance with an idle address stored in said memory means.

13. An ATM switching system according to claim 12, wherein said controlling means includes first means for storing in said shared buffer an idle address from said memory means as a next address along with a cell received from said copy section, and means for storing said idle address for use as a write address to store the next cell received from said copy section for a given outgoing highway in said shared copy section for a given outgoing highway in said shared buffer.

14. An ATM switching system according to claim 12, wherein said controlling means further includes second means for storing a next address read out of said shared buffer at the time a cell is read out of said shared buffer for a given outgoing highway, and means for reading another cell from said shared buffer for said given outgoing highway using the address stored in said second means.

* * * * *